United States Patent [19]

Brunnhofer

[11] Patent Number: 5,019,309

[45] Date of Patent: May 28, 1991

[54] METHOD OF AND APPARATUS FOR PRODUCING A PIPE OF THERMOPLASTIC SYNTHETIC RESIN

[75] Inventor: Erwin Brunnhofer, Fuldabrück, Fed. Rep. of Germany

[73] Assignee: Technoform Caprano & Brunnhofer KG, Fuldabruck, Fed. Rep. of Germany

[21] Appl. No.: 422,389

[22] Filed: Oct. 16, 1989

[30] Foreign Application Priority Data

Jan. 24, 1989 [DE] Fed. Rep. of Germany ....... 3901928

[51] Int. Cl.[5] ............................................. B29C 47/06
[52] U.S. Cl. .................................. 264/103; 156/161; 156/162; 156/188; 156/244.13; 264/173; 264/174; 264/209.2; 264/290.5; 264/40.7; 425/114; 425/382.2; 425/382.3; 425/463; 425/131.1; 425/133.5
[58] Field of Search ............... 264/103/173, 209.2, 264/174, 288.4, 290.5, 40.7; 156/144, 149, 162, 187, 188, 161, 244.13; 425/113, 114, 131.1, 382.2, 382.3, 463, 133.5

[56] References Cited

U.S. PATENT DOCUMENTS

| | | | |
|---|---|---|---|
| 2,398,876 | 4/1946 | Bailey | 264/288.4 |
| 2,810,424 | 10/1957 | Swartswelter et al. | 264/103 |
| 2,994,104 | 8/1961 | Mittag | 264/209.2 |
| 3,015,133 | 1/1962 | Nichols | 264/173 |
| 3,633,629 | 1/1972 | Rider | 156/149 |
| 3,687,765 | 8/1972 | MacLean et al. | 156/188 |
| 3,890,181 | 6/1975 | Stent et al. | 156/244.13 |
| 4,112,031 | 9/1978 | Gohlisch | 264/103 |
| 4,826,423 | 5/1989 | Kemp et al. | 264/209.2 |

FOREIGN PATENT DOCUMENTS

| | | | |
|---|---|---|---|
| 2520998 | 11/1976 | Fed. Rep. of Germany | 425/113 |
| 53-52572 | 5/1978 | Japan | 156/187 |
| 53-72082 | 6/1978 | Japan | 264/209.2 |
| 57-25923 | 2/1982 | Japan | 264/209.2 |
| 57-55575 | 11/1982 | Japan | 264/209.2 |
| 60-18333 | 1/1985 | Japan | 264/173 |
| 1438322 | 6/1976 | United Kingdom | 264/209.2 |

*Primary Examiner*—Jeffery Thurlow
*Assistant Examiner*—Mathieu Vargot
*Attorney, Agent, or Firm*—Herbert Dubno

[57] ABSTRACT

Monofilament threads which are wound around a thermoplastic synethetic resin core tube to form one or more reinforcement coils are generated as they are wrapped around the core tube by liquid crystalline polymer material emerging from respective spinning nozzles which rotate around the core tube while a difference in speed is maintained between the speed at which the reinforcing plastic emerges from the nozzle and the monofilament thread is wound on the core tube to maintain a stretch in the monofilaments.

14 Claims, 2 Drawing Sheets

METHOD OF AND APPARATUS FOR PRODUCING A PIPE OF THERMOPLASTIC SYNTHETIC RESIN

FIELD OF THE INVENTION

My present invention relates to a method of and an apparatus for producing a pipe of a thermoplastic synthetic resin having a helical reinforcement. More particularly, this invention relates to a method of and an apparatus for producing a pipe by winding a reinforcement strand around a core tube or previously placed layers of such windings.

BACKGROUND OF THE INVENTION

It is known to provide at least one layer of a stretched monofilament as a reinforcement for a core tube of thermoplastic material and to constitute that layer as a coil or helix. The core tube can be extruded at the same time as the coil reinforcement is applied thereto or extruded beforehand and can have the coil wound therearound. The core tube which is provided with the coil reinforcement can be constituted so that it is practically rigid or flexible and hoselike, as desired. The term "tube" as used herein, therefore, should be understood to include both relatively rigid pipe structures as well as highly flexible hose structures and the entire range of rigidity between these two extremes.

The core tube itself can be formed as a single layer or as a multilayer composite and can, for example, have an inner layer forming a protective layer or film to prevent an attack by the fluid conducted through the tube. The outer layer can, for example, also be determined by the environment in which the tube is to be used, for example, by the mechanical properties which the tube must have to withstand, environmental factors, or the thermal requirements of the tube, for example, its resistance to hot or cold environments.

In the past, tubes of this type have been made utilizing prefabricated synthetic resin monofilaments as the reinforcing coil strand.

The core tube, whether previously made or extruded at the time, is passed through a coiling machine which generally has one or more spools of the prefabricated monofilament disposed around the periphery of the core tube and located therearound so that each prefabricated monofilament would be helically wound around the core tube.

This process is expensive and highly unreliable or subject to breakdown.

For example, the bobbins or spools must be provided with an endless length of the monofilaments to be effective. In practice, the monofilament is fabricated elsewhere and may be interrupted on the spool. Because the winding of the monofilament on the spool may be irregular, the prefabricated monofilament may break from time to time as it is drawn off the spool.

When such breakage occurs, again the length of monofilament is interrupted on the spool and the system may have to be shutdown to enable restoration of the continuity of the reinforcing filament that is to be wound around the core tube.

Also, the system is subject to costly standstill as the spools empty and must be replaced by new spools.

Furthermore, the means required to generate different degrees of stretch of the preformed monofilament or monofilaments used as reinforcing strands are expensive and complex and prone to breakdown and are not readily controllable during production runs.

Accordingly, prior art reinforcing methods and the resulting products have left much to be desired

OBJECTS OF THE INVENTION

It is the principal object of the present invention to provide an improved method of making a reinforced tube of thermoplastic synthetic resin material, hereinafter referred to generally as a thermoplastic or plastic, which is free from the drawbacks of the earlier systems.

Another object of this invention is to provide an improved method which eliminates drawbacks associated with prefabricated monofilaments and does not require special coiling machines to be able to obtain different degrees of stretch of the monofilament.

Another object of the invention is to provide an improved apparatus for carrying out the method of the invention.

SUMMARY OF THE INVENTION

These objects and others which will become apparent hereinafter are attained, in accordance with the present invention, in that the core tube is displaced with a predetermined translatory speed through at least one nozzle ring rotatable about the core tube at a predetermined angular velocity, while at least one monofilament thread is drawn from at least one spring nozzle of the nozzle ring connected to an extruder for the reinforcing synthetic resin or plastic.

The monofilament thread or strand on its path to the core tube is cooled and is stretched by maintaining a difference between the output speed of the reinforcing plastic from the spinning nozzle and the coiling speed with which the monofilament thread is wound on the core tube. Such monofilament thereby spun, stretched and fed along a single continuous path from the nozzle to the core tube, is coiled on the core tube as a coil reinforcement.

According to the invention, therefore, the monofilament thread or threads are first made during the reinforcing processes of the core tube utilizing the nozzle ring or rings which are rotated with a defined angular velocity and sense of rotation.

The desired pitch angle of the coil can be adjusted by controlling the speed of the nozzle ring and the translation velocity of the core tube.

A coil reinforcement of monofilament threads can thus be formed which has crossovers between the coils if two nozzle rings are provided rotating in opposite senses.

By controllably cooling the monofilament yarns, it is possible to cause the threads to fuse or weld together at their crossing points or to avoid such fusion and welding, may be desired for specific characteristics of the reinforcement.

The cooling is advantageously effected by passing cooling air through the nozzle rings In a preferred embodiment of the invention, the monofilament thread is formed by a liquid crystalline polymer or a polymer mixture of liquid crystalline components Such materials are known (Kunststoffe 78 (1988) 5, pages 411–417). Surprisingly, with the processes of the invention, using this material, high strength of the reinforcement with well defined degrees of stretch can be obtained.

According to the invention, the translatory speed of the core tube and/or the angular velocity of the nozzle ring can be so controlled or regulated that the coil reinforcement can satisfy a variety of requirements.

It has been found to be advantageous to utilize a nozzle ring which has two or more spinning nozzles equidistantly spaced around the inner periphery of the nozzle ring, i.e. in angularly equispaced relationship. Each nozzle then deposits a stretched strand or thread in a helix on the core tube. A plurality of helical threads can be applied to the core tube when, in addition, two or more nozzle rings are used and the nozzle rings are spaced apart along the core tube. The nozzle rings can operate with different angular velocities either with respect to the sense of rotation or the amplitude, or both.

According to the invention, the coil reinforcement can be applied directly to the core tube. However, it has been found to be advantageous to apply to the core tube initially an intermediate layer onto which the monofilament thread is coiled. An intermediate layer can also be provided between two different layers of the coil reinforcement and a final sheath or covering layer can be applied to the coil reinforcement.

To facilitate this, the core tube can be surrounded by one or more annular fixed nozzles which can be provided between the rotating nozzle rings or downstream of the last of the rotating nozzle rings and which can be connected to one or more extruders which can deposit respective synthetic resin layers on the core tube and/or the reinforcement coil layers thereon. The intermediate layers and the final sheath can go bond the reinforcement monofilament threads to the core tube can encapsulate the threads and can also be composed of thermoplastic synthetic resin.

In method terms, therefore, the invention comprises a method of making of pipes which comprises the steps of:

(a) extruding a core tube of a thermoplastic synthetic resin;

(b) translationally advancing the core tube along a path at a linear speed;

(c) rotating around the core tube as it is advanced along the path at an angular velocity a nozzle ring formed with at least one spinning orifice, extruding in a hot state a strand of a reinforcing plastic capable of cooling to form a monofilament, cooling the strand to form the monofilament along a path of the strand from the orifice to the core tube, and winding the monofilament around the core tube as a reinforcing winding thereon; and (d) maintaining a difference between a rate at which the strand is extruded from the orifice and a rate at which the monofilament is wound on the tube to stretch the monofilament over the path of the strand and prior to winding of the monofilament on the tube.

The apparatus according to the invention for practicing this method can comprise:

means for translationally advancing the core tube along a path at a linear speed;

means for rotating around the core tube as it is advanced along the path at an angular velocity a nozzle ring formed with at least one spinning orifice, extruding in a hot state a strand of a reinforcing plastic capable of cooling to form a monofilament, cooling the strand to form the monofilament along a path of the strand from the orifice to the core tube, and winding the monofilament around the core tube as a reinforcing winding thereon; and means for maintaining a difference between a rate at which the strand is extruded from the orifice and a rate at which the monofilament is wound on the tube to stretch the monofilament over the path of the strand and prior to winding of the monofilament on the tube.

BRIEF DESCRIPTION OF THE DRAWING

The above and other objects, features and advantages of my invention will become more readily apparent from the following description, reference being made to the accompanying highly diagrammatic drawing in which:

FIG. 1a is a detail of the region IA of FIG. 1;

FIG. 1b is a detail of the region IB of FIG. 1;

FIG. 1c is a detail of the region IC of FIG. 1;

SPECIFIC DESCRIPTION

Figure 1:
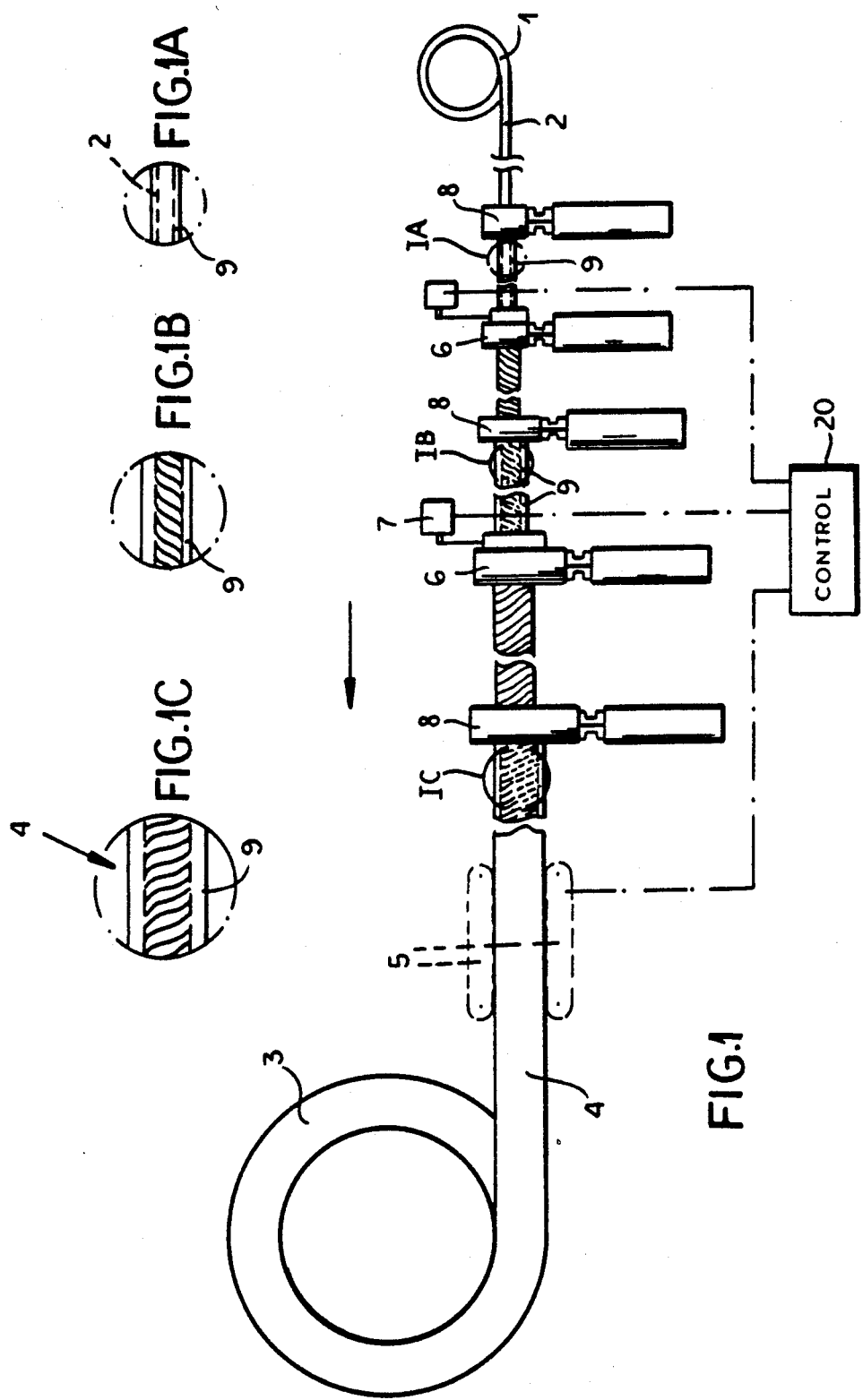
FIG. 1 is a diagrammatic side elevational view illustrating an apparatus for carrying out the method of the invention.

The drawing shows an apparatus for carrying out the method of the invention in which a coil 1 of prefabricated thermoplastic synthetic resin core tube 2 slides this tube along a path terminating in a coil 3 into which the coil-reinforced completed tube 4 is wound. The mandrel upon which the coil 3 is wound can be driven and a pipe drawing device 5 formed by two belts can be provided for advancing the core tube 2 with a predetermined translatory velocity along the path.

Figure 2:
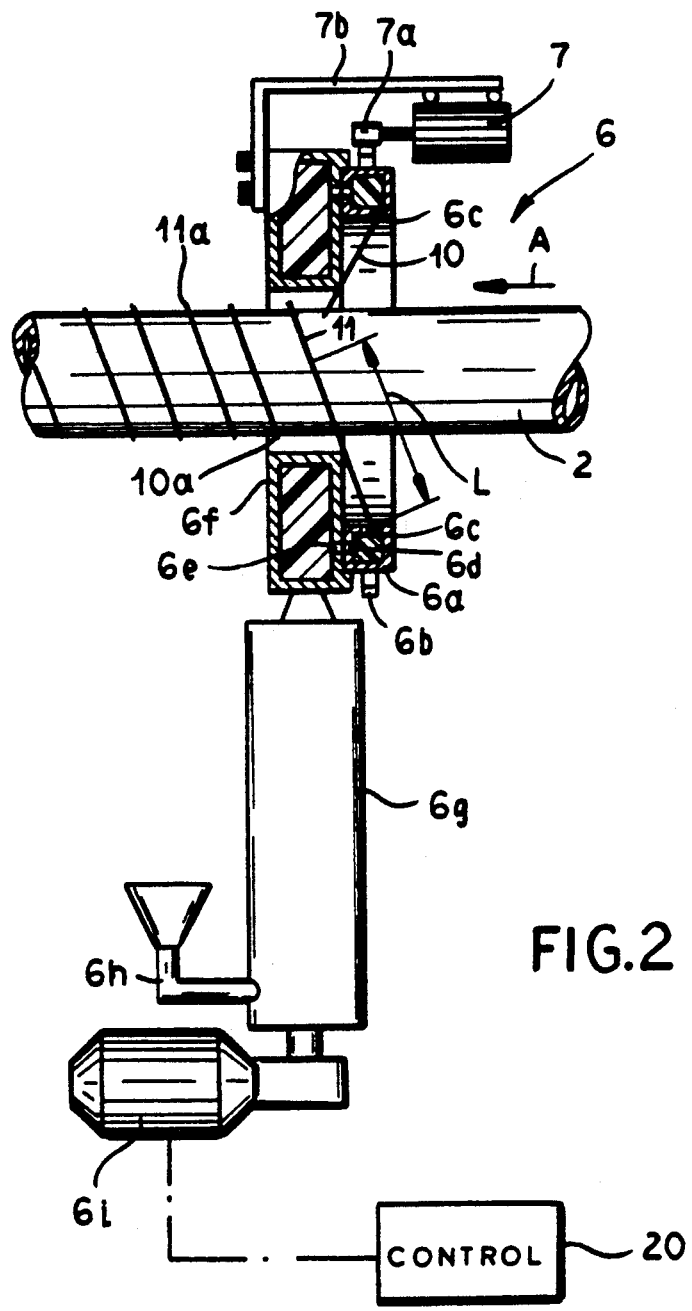
FIG. 2 is an axial section through a rotating nozzle ring of the type for applying the monofilament threads used in FIG. 1.

Along the path, the core tube 2 passes with its predetermined translatory velocity through a plurality of axially spaced rotating nozzle rings 6. As can be seen from FIG. 2, each of the nozzle rings 6 can comprises a rotating member 6a mounted on a housing 6f and formed with a pair of nozzle orifices 6c feeding respective synthetic resins threads 10, 11 of monofilament to respective coils 10a and 11a on the core tube 2. Over the length 11 of the path between the nozzle and the core tube 2, each thread is cooled by the blast of cooling air passing as shown by the arrow A through the nozzle rings and is stretched as a result of greater linear speed with which the thread is wound on the tube 2 than the resin of the thread is emitted from its respective nozzle orifice.

The members 6a are provided with an external gear 6b meshing with a drive pinion 7a of an electric motor 7.

The support 6f receives the thermoplastic synthetic resin forming the liquid crystalline polymer from an extruder 6g driven by a motor 6i and from which the synthetic resin matter is forwarded by a funnel 6h.

From the housing 6f, the liquid crystalline polymeric material is supplied via ports 6e to the annular channel 6d of the rotating part 6a of the ring distributing the plastic to the nozzle orifices 6c.

The monofilament on its way to the core tube 2, produced along its continuous path thereto by the nozzle ring is therefore cooled.

The stretched monofilament threads thus form a layer constituting the coil reinforcement.

In the embodiment shown in FIGS. 1, 1a, 1b and 1c, the core tube is also drawn through a plurality of stationary annular nozzle units 8 with respective extruders for applying, upstream of the first layer of coil reinforcement, an intermediate layer 9 of plastic which acts as a bonding layer in which the monofilament yarn is embedded and which has adhesive or bonding characteristics both with respect to the tube 2 and with respect to the monofilament coil 10a, 11a.

The second nozzle arrangement 8 is provided between the first and second spinning ring nozzles and deposits a layer 9 (FIG. 1b) as a sheath on the underlying coil layer and as an adhesive bonding layer for the next coil layer to be applied.

The final fixed nozzle ring 8 deposits a final sheath 9 of thermoplastic synthetic resin on the last coil reinforcement layer.

As is apparent from FIG. 1, moreover, a control 20 can be provided for the motor 7 and the drive 5 for the translatory speed to maintain the requisite angular velocities translatory speed. The control 20 may also be connected to the motors 6i (FIG. 2) so that it can also regulate the differences in speeds which determines the stretch.

I claim:

1. A method of making a pipe, comprising the steps of:
   (a) extruding a core tube of a thermoplastic synthetic resin;
   (b) translationally advancing said core tube along a path at a linear speed;
   (c) rotating at an angular velocity around said core tube as said core tube is advanced along said path a plurality of nozzle rings each formed with at least one spinning orifice and said nozzle rings spaced along said path of said tube and rotatable therearound with different angular velocities with respect to a sense of rotation or magnitude, extruding from said nozzle rings in a hot state a plurality of strands of a reinforcing plastic capable of cooling to form monofilaments, cooling the strands to form said monofilaments along a path of the strands from said orifices to said core tube, and winding said monofilaments around said core tube as a reinforcing winding thereon;
   (d) maintaining a difference between a rate at which said strands are extruded from said orifices and a rate at which said monofilaments are wound on said tube to stretch said monofilaments over the path of said strands and prior to winding of said monofilaments on said tube;
   (e) applying an extruded bonding layer to completely encompass said tube from a nonrotatable nozzle rings; and
   (f) winding by steps (c) and (d) at least one further monofilament onto said extruded layer with another rotatable nozzle ring.

2. The method defined in claim 1 wherein at least one of said speed and said velocity is controlled to maintain said difference.

3. The method defined in claim 2 wherein both said speed and said velocity are regulated to maintain said difference.

4. The method defined in claim 1 wherein at least two such strands are extruded at said nozzle rings to form respective monofilaments which are wound on said tube from respective orifices angularly equispaced around said ring.

5. The method defined in claim 1 wherein said reinforcing plastic contains at least one liquid crystalline polymer.

6. The method defined in claim 5 wherein said reinforcing plastic consists of a liquid crystalline polymer.

7. The method defined in claim 5 wherein said reinforcing plastic consists of a mixture of liquid crystalline polymers.

8. The method defined in claim 1 wherein said layer is applied to said tube prior to the winding of said monofilaments thereon.

9. The method defined in claim 8 wherein another said layer is applied to said tube subsequent to the winding of said monofilaments thereon from a respective nonrotatable nozzle ring.

10. The method defined in claim 1 wherein said layer is applied to said tube subsequent to the winding of said monofilaments thereon.

11. An apparatus for making a pipe from an extruded core tube of a thermoplastic synthetic resin, comprising:
    means for translationally advancing said core tube along a path at a linear speed;
    means for rotating at an angular velocity around said core tube as said core tube is advanced along said path a plurality of nozzle rings each formed with at least one spinning orifice and said nozzle rings spaced along said path of said tube and rotatable therearound with different angular velocities with respect to a sense of rotation or magnitude, means for extruding in a hot state of plurality of strands of a reinforcing plastic capable of cooling to form monofilaments, the strands being cooled to form said monofilaments along a path of the strands from said orifices to said core tube, and means for winding said monofilaments around said core tube as a reinforcing winding thereon;
    means for maintaining a difference between a rate at which said strands are extruded from said orifices and a rate at which said monofilaments are wound on said tube to stretch said monofilaments over the path of said strands and prior to winding of said monofilaments on said tube;
    means for applying an extruded layer to said tube from a nonrotatable nozzle ring; and
    means for winding at least one further monofilament onto said extruded layer with another rotatable nozzle ring.

12. The apparatus defined in claim 11 wherein said means for maintaining said difference includes means for controlling said linear speed.

13. The apparatus defined in claim 11 wherein said nonrotatable nozzle ring is disposed upstream of the nozzle rings provided with said orifices so that said monofilaments are wound on said layer.

14. The apparatus defined in claim 11 wherein said nonrotatable nozzle ring is disposed downstream of the nozzle rings provided with said orifices so that said layer is applied to the monofilaments wound on said layer.

* * * * *